United States Patent
Baig et al.

(10) Patent No.: US 11,565,821 B2
(45) Date of Patent: Jan. 31, 2023

(54) HYBRID ENERGY STORAGE SYSTEM CONTROL FOR AN AIRCRAFT ENGINE

(71) Applicant: United Technologies Corporation, Farmington, CT (US)

(72) Inventors: Zubair Ahmed Baig, Glastonbury, CT (US); Neil Terwilliger, Meriden, CT (US); Sorin Bengea, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 795 days.

(21) Appl. No.: 16/524,752

(22) Filed: Jul. 29, 2019

(65) Prior Publication Data

US 2020/0031480 A1 Jan. 30, 2020

Related U.S. Application Data

(60) Provisional application No. 62/711,855, filed on Jul. 30, 2018.

(51) Int. Cl.
*B64D 27/02* (2006.01)
*H02J 7/14* (2006.01)
*B60L 15/20* (2006.01)
*B60L 50/61* (2019.01)
*H02J 7/34* (2006.01)

(52) U.S. Cl.
CPC .............. *B64D 27/02* (2013.01); *B60L 15/20* (2013.01); *B60L 50/61* (2019.02); *H02J 7/1423* (2013.01); *B60L 2200/10* (2013.01); *B60L 2260/50* (2013.01); *B64D 2027/026* (2013.01); *H02J 7/143* (2020.01); *H02J 7/345* (2013.01)

(58) Field of Classification Search
USPC .......................................................... 244/58
See application file for complete search history.

(56) References Cited

U.S. PATENT DOCUMENTS

| | | | |
|---|---|---|---|
| 7,786,620 B2 | 8/2010 | Vuk et al. |
| 7,872,368 B2 | 1/2011 | Karimi et al. |
| 8,296,036 B2 | 10/2012 | Matuszeski et al. |
| 8,384,343 B2 | 2/2013 | Kojori et al. |
| 8,963,365 B2 | 2/2015 | King et al. |
| 9,840,997 B2 | 12/2017 | Dooley et al. |
| 9,873,518 B2 | 1/2018 | Sautreuil et al. |
| 10,081,350 B2 | 9/2018 | Zhou |

(Continued)

OTHER PUBLICATIONS

EP Application No. 19189124.1 Extended EP Search Report dated Jan. 7, 2020, 9 pages.

*Primary Examiner* — Jared Fureman
*Assistant Examiner* — Aqeel H Bukhari
(74) *Attorney, Agent, or Firm* — Cantor Colburn LLP (57) ABSTRACT

A power system of an aircraft includes a hybrid energy storage system with at least two energy storage subsystems each having a different power-energy density. The power system also includes one or more electric motors operably coupled to the hybrid energy storage system and to an aircraft engine. The power system further includes a means for controlling one or more electric power flows of the hybrid energy storage system to/from the one or more electric motors based on a modeled electric power demand associated with an engine load of one or more spools of the aircraft engine.

20 Claims, 3 Drawing Sheets

(56) References Cited

U.S. PATENT DOCUMENTS

| | | |
|---|---|---|
| 10,128,662 B2 | 11/2018 | Radun et al. |
| 2014/0084817 A1 | 3/2014 | Bhavaraju et al. |
| 2014/0260306 A1 | 9/2014 | Dooley et al. |
| 2014/0300307 A1 | 10/2014 | Miles |
| 2014/0345281 A1* | 11/2014 | Galbraith ............... F02C 1/00 60/716 |
| 2015/0367950 A1 | 12/2015 | Rajashek et al. |
| 2016/0204615 A1 | 7/2016 | Radun et al. |
| 2016/0236790 A1* | 8/2016 | Knapp ............... G08G 5/0021 |
| 2017/0057363 A1 | 3/2017 | Huh et al. |
| 2017/0321608 A1 | 11/2017 | Crowley et al. |
| 2018/0003109 A1 | 1/2018 | Lents et al. |
| 2018/0300191 A1 | 10/2018 | Bengea et al. |
| 2019/0005826 A1 | 1/2019 | Lax et al. |
| 2019/0063333 A1 | 2/2019 | Bengea et al. |
| 2020/0123926 A1 | 4/2020 | Amari et al. |
| 2020/0248622 A1 | 8/2020 | Crowley et al. |
| 2020/0347787 A1 | 11/2020 | Crowley et al. |
| 2021/0394916 A1 | 12/2021 | Baig et al. |

* cited by examiner

HYBRID ENERGY STORAGE SYSTEM CONTROL FOR AN AIRCRAFT ENGINE

CROSS-REFERENCE TO RELATED APPLICATION

This application claims the benefit of priority to U.S. Provisional Application No. 62/711,855 filed Jul. 30, 2018, the disclosure of which is incorporated herein by reference in its entirety.

BACKGROUND

Exemplary embodiments pertain to aircraft systems, and more particularly to systems and methods of controlling a hybrid energy storage system for an aircraft engine.

Aircraft, such as those utilized by commercial airlines, typically include two or more gas turbine engines mounted in or under the wings of the aircraft. The engines generate thrust, propelling the aircraft forward and allowing operation of the aircraft. A typical engine utilized in this configuration includes a fan forward of a turbine engine core, with the turbine engine core driving the rotation of the fan either via a direct drive system or a geared connection. Some aircraft propulsion systems also include one or more electric motors and/or generators to provide a supplemental power source under certain aircraft operating conditions.

BRIEF DESCRIPTION

Disclosed is a power system of an aircraft, where the power system includes a hybrid energy storage system with at least two energy storage subsystems each having a different power-energy density. The power system also includes one or more electric motors operably coupled to the hybrid energy storage system and to an aircraft engine. The power system further includes a means for controlling one or more electric power flows of the hybrid energy storage system to/from the one or more electric motors based on a modeled electric power demand associated with an engine load of one or more spools of the aircraft engine.

In addition to one or more of the features described above or below, or as an alternative, further embodiments may include where the means for controlling the one or more electric power flows of the hybrid energy storage system includes a power management controller operable to detect one or more conditions of the at least two energy storage subsystems and configure the one or more electric power flows between the hybrid energy storage system and the one or more electric motors.

In addition to one or more of the features described above or below, or as an alternative, further embodiments may include where the power management controller is operable to configure at least one of the one or more electric power flows from a first energy storage subsystem of the at least two energy storage subsystems to charge a second energy storage subsystem of the at least two energy storage subsystems.

In addition to one or more of the features described above or below, or as an alternative, further embodiments may include where the first energy storage subsystem includes a battery system and the second energy storage subsystem includes a super/ultra-capacitor, and further including a bidirectional converter operably coupled to the super/ultra-capacitor and power conditioning electronics operably coupled to the one or more electric motors.

In addition to one or more of the features described above or below, or as an alternative, further embodiments may include where the power management controller is operable to configure at least one of the one or more electric power flows from the super/ultra-capacitor through the bidirectional converter and the power conditioning electronics to power the one or more electric motors.

In addition to one or more of the features described above or below, or as an alternative, further embodiments may include where the bidirectional converter is operably coupled to the battery system, and the power management controller is operable to configure at least one of the one or more electric power flows from the battery system through the bidirectional converter and the power conditioning electronics to power the one or more electric motors and/or engine subsystem loads.

In addition to one or more of the features described above or below, or as an alternative, further embodiments may include where the power management controller is operable to select between powering the one or more electric motors by the super/ultra-capacitor and/or the battery system based on a power level of the modeled electric power demand and the one or more conditions of the super/ultra-capacitor and the battery system, and further where the power management controller is operable to control the one or more electric motors in a generator mode and charge the super/ultra-capacitor.

In addition to one or more of the features described above or below, or as an alternative, further embodiments may include where the power management controller is operable to select between powering the one or more electric motors by the super/ultra-capacitor and/or the battery system based on an expected duration of the modeled electric power demand and the one or more conditions of the super/ultra-capacitor and the battery system.

In addition to one or more of the features described above or below, or as an alternative, further embodiments may include where the power management controller is operable to predictively switch to source power from the hybrid energy storage system instead of the aircraft engine when the one or more electric motors are being operated.

Also disclosed is a method that includes determining, by a controller, an engine load of one or more spools of an aircraft engine. The controller determines a modeled electric power demand based on the engine load. One or more electric power flows of a hybrid energy storage system are configured based on the modeled electric power demand, where the hybrid energy storage system includes at least two energy storage subsystems each having a different power-energy density.

In addition to one or more of the features described above or below, or as an alternative, further embodiments may include detecting one or more conditions of the at least two energy storage subsystems, and configuring the one or more electric power flows between the hybrid energy storage system and one or more electric motors based on the one or more conditions of the at least two energy storage subsystems.

In addition to one or more of the features described above or below, or as an alternative, further embodiments may include configuring at least one of the one or more electric power flows from a first energy storage subsystem of the at least two energy storage subsystems to charge a second energy storage subsystem of the at least two energy storage subsystems.

In addition to one or more of the features described above or below, or as an alternative, further embodiments may include where the first energy storage subsystem includes a battery system and the second energy storage subsystem including a super/ultra-capacitor, and the method may include configuring at least one of the one or more electric power flows from the super/ultra-capacitor through a bidirectional converter and power conditioning electronics to power the one or more electric motors.

In addition to one or more of the features described above or below, or as an alternative, further embodiments may include configuring at least one of the one or more electric power flows from the battery system through the bidirectional converter and the power conditioning electronics to power the one or more electric motors and/or engine subsystem loads.

In addition to one or more of the features described above or below, or as an alternative, further embodiments may include selecting between powering the one or more electric motors by the super/ultra-capacitor and/or the battery system based on a power level of the modeled electric power demand and the one or more conditions of the super/ultra-capacitor and the battery system, and controlling the one or more electric motors in a generator mode to charge the super/ultra-capacitor.

In addition to one or more of the features described above or below, or as an alternative, further embodiments may include selecting between powering the one or more electric motors by the super/ultra-capacitor and/or the battery system based on an expected duration of the modeled electric power demand and the one or more conditions of the super/ultra-capacitor and the battery system.

In addition to one or more of the features described above or below, or as an alternative, further embodiments may include predictively switching to source power from the hybrid energy storage system instead of the aircraft engine when the one or more electric motors are being operated.

Also disclosed is a system for an aircraft, where the system includes a gas turbine engine with at least one shaft and a hybrid energy storage system including a super/ultra-capacitor and a battery system. The system also includes one or more electric motors operably coupled to the hybrid energy storage system and to the at least one shaft, and a means for controlling one or more electric power flows of the hybrid energy storage system to/from the one or more electric motors based on a modeled electric power demand associated with an engine load of the gas turbine engine.

In addition to one or more of the features described above or below, or as an alternative, further embodiments may include where the means for controlling the one or more electric power flows of the hybrid energy storage system includes a power management controller operable to detect one or more conditions of the super/ultra-capacitor and the battery system and configure the one or more electric power flows from the hybrid energy storage system to the one or more electric motors based on the one or more conditions and the engine load of the at least one shaft.

In addition to one or more of the features described above or below, or as an alternative, further embodiments may include where the power management controller is operable to predictively switch to source power from the hybrid energy storage system instead of the gas turbine engine when the one or more electric motors are being operated.

A technical effect of systems and methods is achieved by providing hybrid energy storage system control for an aircraft engine as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
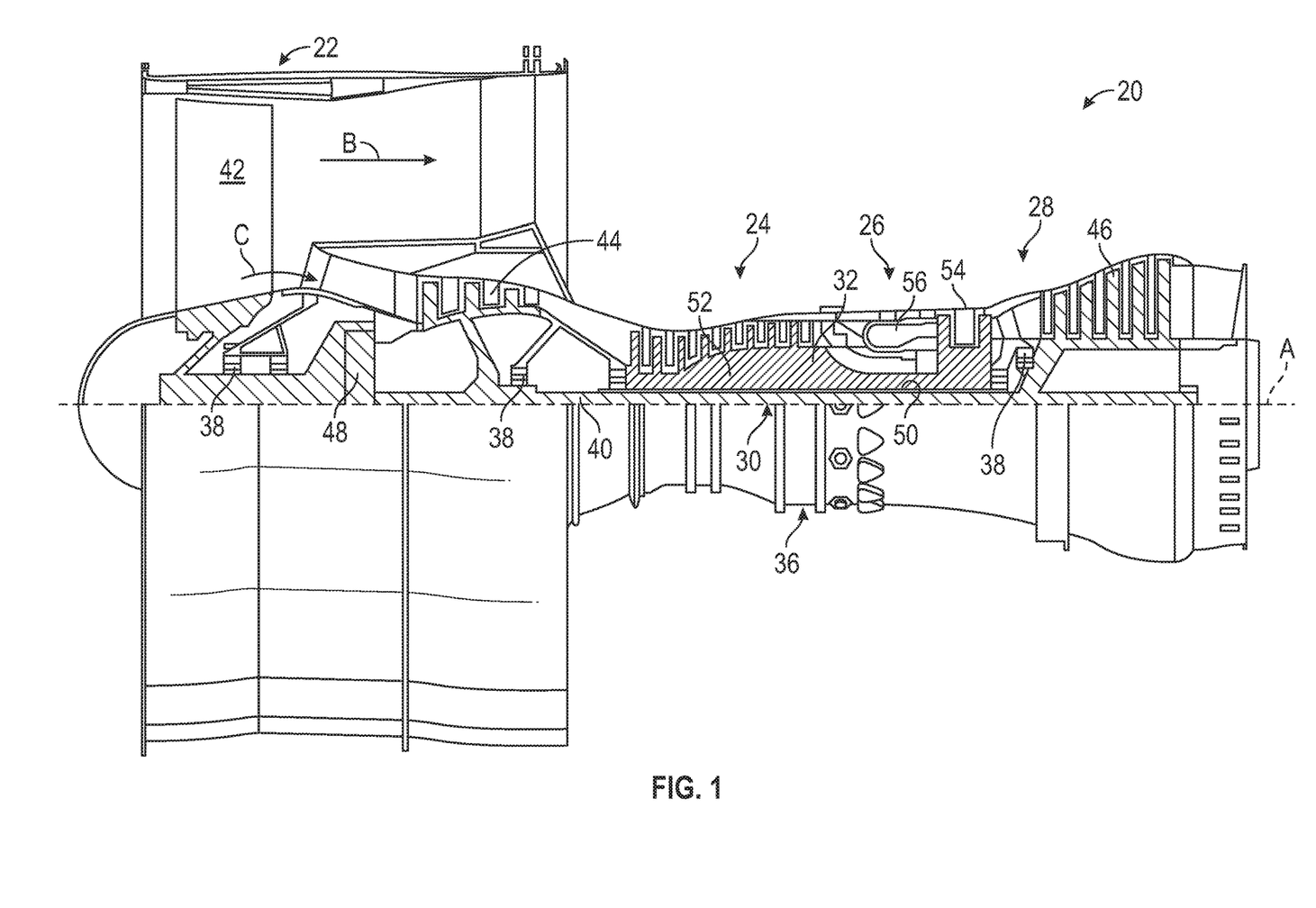
FIG. 1 is a schematic illustration of a gas turbine engine in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

Figure 2:
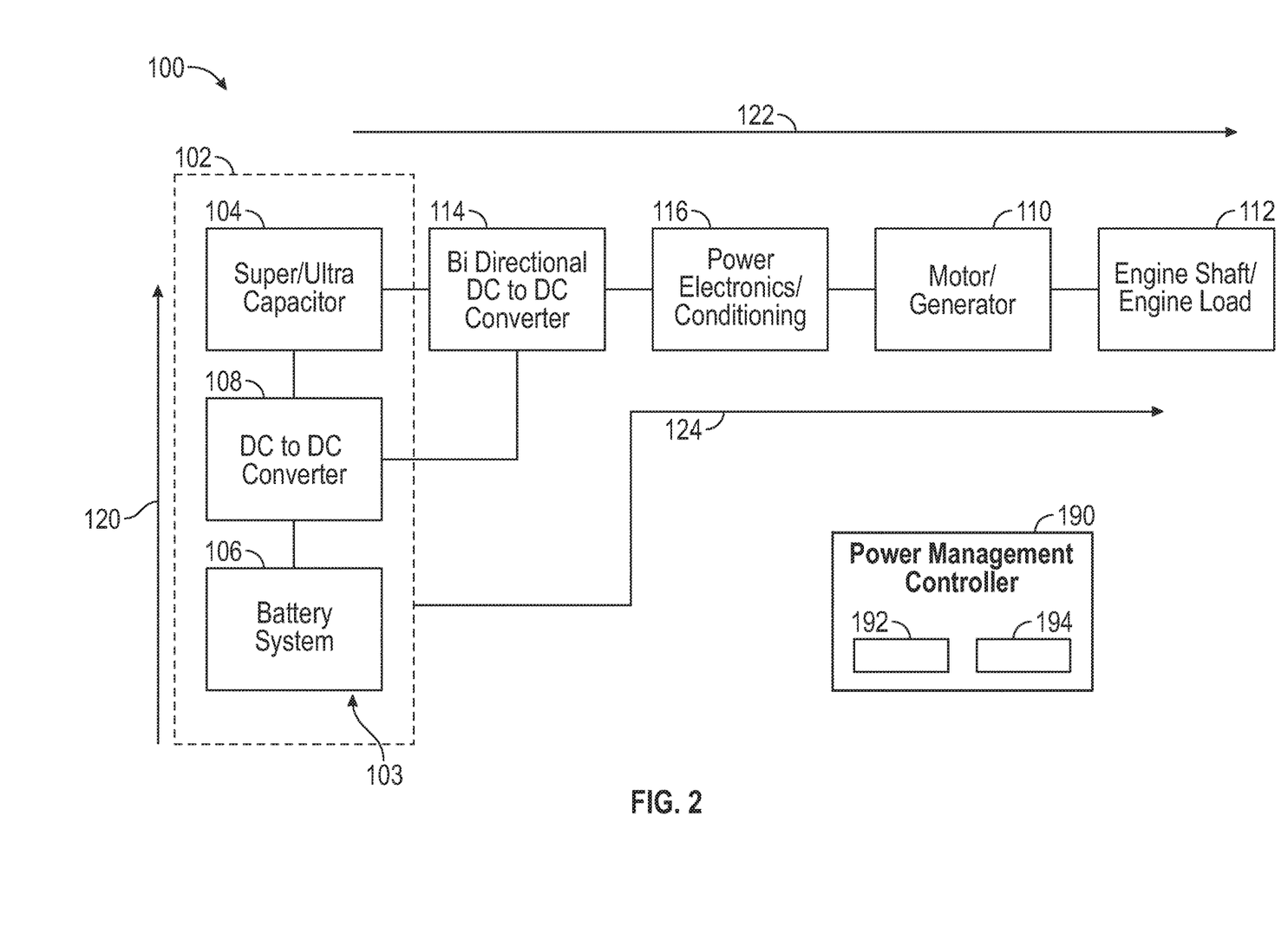
FIG. 2 is a schematic illustration of a power system in accordance with an embodiment of the disclosure.

FIG. 2 depicts a power system 100 of the gas turbine engine 20 of FIG. 1 (also referred to generally as an aircraft engine) according to an embodiment. The power system 100 can include a hybrid energy storage system 102 with at least two energy storage subsystems 103 each having a different power-energy density. In the example of FIG. 2, the at least two energy storage subsystems 103 include a super/ultra-capacitor 104 and a battery system 106. The hybrid energy storage system 102 may be sized to store energy to support transient bursts of the gas turbine engine 20 for a power assist during a snap acceleration or power shedding during a snap deceleration. Using only the battery system 106 for a wide range of acceleration and deceleration conditions may result in oversizing battery capacity with corresponding additional weight carried to meet potential transient demands. The super/ultra-capacitor 104 provides a lower storage capacity than the battery system 106 but has a higher charge/discharge rate as compared to the battery system 106. The super/ultra-capacitor 104 can be comprised of one or more electrochemical double layer capacitors (EDLCs) or electrochemical capacitors that have a high energy density when compared to common capacitors, e.g., several orders of magnitude greater than a high-capacity electrolytic capacitor. The super/ultra-capacitor 104 can have higher energy efficiency due to a lower internal resistance than the battery system 106. The super/ultra-capacitor 104 can be operatively coupled to the battery system 106 through a direct current (DC)-to-DC converter 108. The DC-to-DC converter 108 can convert a voltage level of the battery system 106 to match a voltage level of the super/ultra-capacitor 104 to support charging of the super/ultra-capacitor 104 by the battery system 106. In alternate embodiments, the DC-to-DC converter 108 can be omitted where regulation between the super/ultra-capacitor 104 and the battery system 106 is not needed.

In embodiments, one or more electric motors 110 are operably coupled to the hybrid energy storage system 102 and to at least one shaft 112 of an aircraft engine, such as the inner shaft 40 of low speed spool 30 or the outer shaft 50 of high speed spool 32 of the gas turbine engine 20 of FIG. 1. In the example of FIG. 1, the hybrid energy storage system 102 is operably coupled to a bidirectional DC-to-DC converter 114 which is operably coupled to power conditioning electronics 116 that interface with the one or more electric motors 110. The bidirectional DC-to-DC converter 114 can perform any voltage conversions needed between the hybrid energy storage system 102 and the power conditioning electronics 116 depending on whether the one or more electric motors 110 are operating in a motor mode or a generator mode. The power conditioning electronics 116 can include inverter/motor drive circuitry that applies known motor control techniques to control the speed and/or torque produced by the one or more electric motors 110. For example, during a snap acceleration, electric power from the hybrid energy storage system 102 is provided through the bidirectional DC-to-DC converter 114 and the power conditioning electronics 116 to drive the one or more electric motors 110 in a motor mode to supplement rotation of the engine shaft 112 as opposed by an engine load. The engine load on the engine shaft 112 can vary depending upon a flight regime and accessory loading from generators, environmental control systems, engine bleeds, and other known loading factors. During a snap deceleration, the one or more electric motors 110 can operate in a generator mode to increase the engine load on the engine shaft 112, with resulting current passed through the bidirectional DC-to-DC converter 114 for storage in the hybrid energy storage system 102. The bidirectional DC-to-DC converter 114 can be operably coupled to the super/ultra-capacitor 104 and/or the battery system 106. In some embodiments, the bidirectional DC-to-DC converter 114 is electrically coupled to the DC-to-DC converter 108.

In embodiments, the power system 100 also includes a means for controlling one or more electric power flows of the hybrid energy storage system 102 to/from the one or more electric motors 110 based on a modeled electric power demand of an engine load of the aircraft engine that may be at a current time step or predicted at one or more future time steps. The means for controlling the one or more electric power flows of the hybrid energy storage system 102 can be a power management controller 190 (also referred to as controller 190) operable to detect one or more conditions of the super/ultra-capacitor 104 and the battery system 106 and configure the one or more electric power flows between the hybrid energy storage system 102 and the one or more electric motors 110. Detectable conditions can include a current charge level, a remaining storage capacity, health/fault status, and other such information. Further, the conditions may be derived based on environmental factors or aging effects. For example, if a temperature of the battery system 106 impacts the storage capacity and/or charge/discharge rate, then such information can be determined in assessing the condition of the battery system 106.

The power management controller 190 can interface with and control multiple elements of the power system 100 and the gas turbine engine 20, such as switches, current sensors, voltage sensors, temperature sensors, communication buses, and the like. In an embodiment, the controller 190 includes a memory system 192 to store instructions that are executed by a processing system 194 of the controller 190. The executable instructions may be stored or organized in any manner and at any level of abstraction, such as in connection with a controlling and/or monitoring operation of the power system 100 and/or the gas turbine engine 20. The processing system 194 can include one or more processors that can be any type of central processing unit (CPU), including a microprocessor, a digital signal processor (DSP), a microcontroller, an application specific integrated circuit (ASIC), a field programmable gate array (FPGA), or the like. Also, in embodiments, the memory system 192 may include random access memory (RAM), read only memory (ROM), or other electronic, optical, magnetic, or any other computer readable medium onto which is stored data and control algorithms in a non-transitory form.

An example of electric power flows of the hybrid energy storage system 102 can include a first electric power flow 120 from the battery system 106 through the DC-to-DC converter 108 to charge the super/ultra-capacitor 104. Another example of electric power flows of the hybrid energy storage system 102 can include a second electric power flow 122 from the super/ultra-capacitor 104 through the bidirectional DC-to-DC converter 114 and the power conditioning electronics 116 to power the one or more electric motors 110. A further example of electric power flows of the hybrid energy storage system 102 can include a third electric power flow 124 from the battery system 106 through the bidirectional DC-to-DC converter 114 and the power conditioning electronics 116 to power the one or more electric motors 110. Other electric power flow variations are contemplated, such as reverse flows of the electric power flows 122, 124 during generator mode of the one or more electric motors 110. Selection and timing for engaging the various electric power flows 120-124 can be controlled by the power management controller 190. As one example, the power management controller 190 may be implemented as a predictive controller or other model-based control as further described in reference to FIG. 3.

Figure 3:
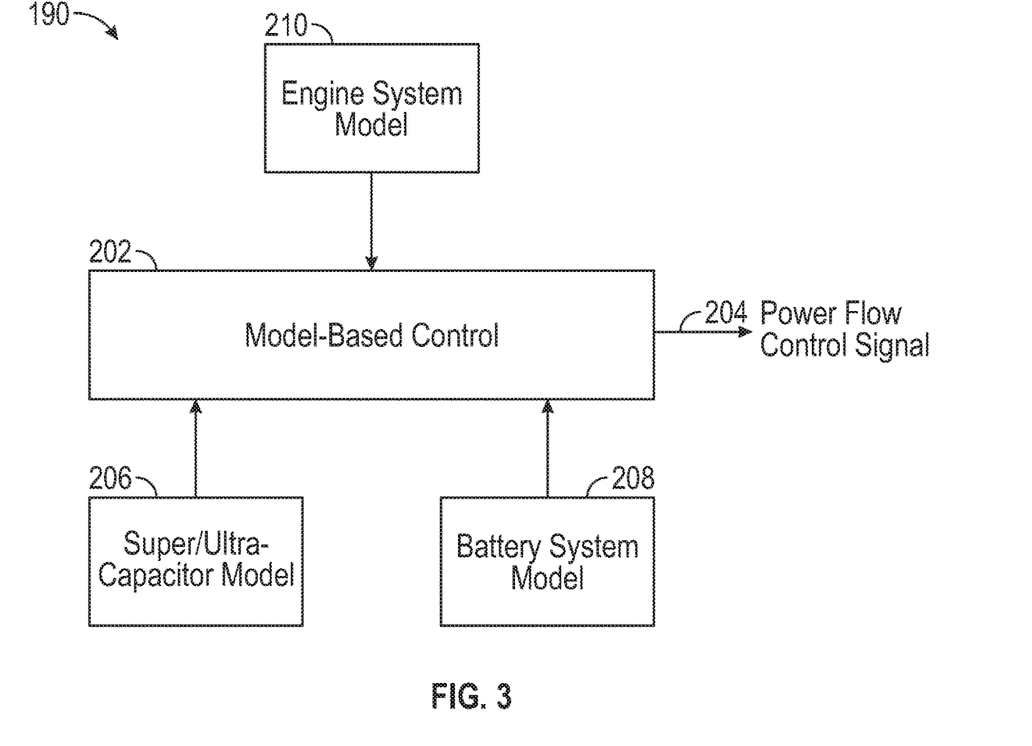
FIG. 3 is a schematic illustration of a control system in accordance with an embodiment of the disclosure.

In the example of FIG. 3 with continued reference to FIGS. 1 and 2, the power management controller 190 includes a model-based control 202, such as a model predictive control, operable to output one or more electric power flow control signals 204 based on a super/ultra-capacitor model 206, a battery system model 208, and an engine system model 210. The models 206, 208, 210 can comprise maps, equations, and the like that relate voltage, current, electrical power, and state-of-charge, for example. The system-level control algorithm integrates the models associated with each subsystem and includes their respective constraints. The electric motor(s) can be modeled as $T_{motor}=F_{motor}(I_{phase}, V, N_{shaft})$ where the function can be an equation, a look-up table, a map that relates the currents in all the motor phases, the voltage, and the shaft rotational speed to generated motor torque. Several constraints are defined and included in the overall control problem definition. These are related to motor torque, $T_{motor,\ min} \leq T_{motor} \leq T_{motor,\ max}$, shaft angular speed, $N_{shaft,\ min} \leq N_{shaft} \leq N_{shaft,\ max}$. Similarly, a model $F_{generator}(I_{phase}, V, N_{shaft})$ and constraints $T_{generator,\ min} \leq T_{generator} \leq T_{generator,\ max}$ are defined for the generator(s). The phase currents that control the motor torque can be generated by a motor drive/inverter and related to the direct current through another set of equations, $I_{phase}=F_{inv}(V, I_{DC}, N_{shaft})$, where $F_{inv}$ could be a set of equations, maps or look-up tables. The direct current, $I_{DC}$, depends upon to the current provided by the ultra-capacitor or supercapacitor $I_{DC,\ UC}$ and/or the current supplied by the batteries, $I_{DC,\ Bat}$, and needs to be bounded $I_{DC,\ min} \leq I_{DC} \leq I_{DC,\ max}$ (with the positive upper bound active during discharging, and the negative, lower bound active during charging). Each of the current depends on the state-of-charge and state-of-health of the ultra-capacitor and battery system, $I_{DC,UC}=F_{I,UC}(SOC_{UC}, V, mode)$ and $I_{DC,Bat}=F_{I,Bat}(SOC_{Bat}, V, mode)$. The state-of-charge and state-of-health are dynamical states that are interrelated and depend on the current supplied by each storage subsystem. Because they have different dynamics depending on whether they are charging or discharging the functions that relate current, SOC, SOH are specific to each mode of operation. In order to ensure that the batteries continue to operate correctly for many charging-discharging cycles, the two key parameters are bounded: $SOC_{Bat,min} \leq SOC_{Bat} \leq SOC_{Bat,max}$ and $SOH_{Bat,min} \leq SOH_{Bat}$. All the models mentioned above and their associated constraints are lumped into an integrated, dynamical system-level model $dX_{Sys}=F_{sys}(X_{Sys}, mode)$ and constraints $X_{Sys,\ min} \leq X_{Sys} \leq X_{Sys,max}$. The objective in controlling the hybrid energy storage system is to meet the requested shaft torque; a cost function that penalizes the errors between the motor torque $T_{Motor}$ and the requested shaft torque $T_{Shaft,Req}$ can be used $\int [T_{Motor}(t)-T_{Shaft,Req}(t)]dt$, where the integral is calculated at each time step over a receding horizon [0, Dt], assuming that the requested motor torque is known over this time interval. The motor torque request can be set based on various external conditions such as: shaft speed and acceleration; overall system operating condition. The optimization problem including the defined cost function, system dynamics and constraints has as control inputs the current supplied by the battery system and modes of operation (charging, discharging) for each subsystem, and it is therefore a mixed-integer programming problem which can be solved numerically by using customized solvers.

The super/ultra-capacitor model 206 can model performance of the super/ultra-capacitor 104 of FIG. 2 using observed conditions and a physics-based model that incorporates sizing parameters, for example, to determine predicted charge time, discharge time, capacity, available charge, and other such information. Similarly, the battery system model 208 can model performance of the battery system 106 of FIG. 2 using observed conditions and a physics-based model that incorporates sizing parameters, for example, to determine predicted charge time, discharge time, capacity, available charge, and other such information. The engine system model 210 may model an engine load on the engine shaft 112 presently and at one or more future time steps. The engine system model 210 may receive engine parameters from an engine control or flight computer system (not depicted) that assist with load predictions. The load predictions can include flight regime (e.g., idle, takeoff, climb, cruise, decent, thrust reverse, etc.) along with demands due to known loads and operating status of other propulsion system elements (e.g., operational status of other engines on the aircraft). The power flow control signals 204 can control switching states and times of elements within the DC-to-DC converter 108, the bidirectional DC-to-DC converter 114, the power conditioning electronics 116, and/or other circuitry (not depicted).

As one example, at each computational time step, the model-based control 202 receives information about current engine loading and an engine load over one or more future time steps from the engine system model 210. The model-based control 202 can access the super/ultra-capacitor model 206 and the battery system model 208 with corresponding power constraints to determine power profiles for the super/ultra-capacitor 104 and the battery system 106 such that a power demand is met. Constraints can include healthy values, rates, and/or ranges for associated parameters. For instance, if a power demand exceeds the modeled capability of the battery system 106, then electric power can be provided by the super/ultra-capacitor 104 via the second electric power flow 122. After the super/ultra-capacitor 104 is discharged, the power management controller 190 can perform recharging from the battery system 106 using the first electric power flow 120. As another example, the power demand can be initially met by the battery system 106 via the third electric power flow 124, but upon exceeding the power demand provided by battery system 106, additional power can be provided by the super/ultra-capacitor 104 via the second electric power flow 122. In some embodiments, time-based analysis selects either or both of the super/ultra-capacitor 104 and the battery system 106, for instance, by determining current demand and charge/discharge rates and capacity.

Figure 4:
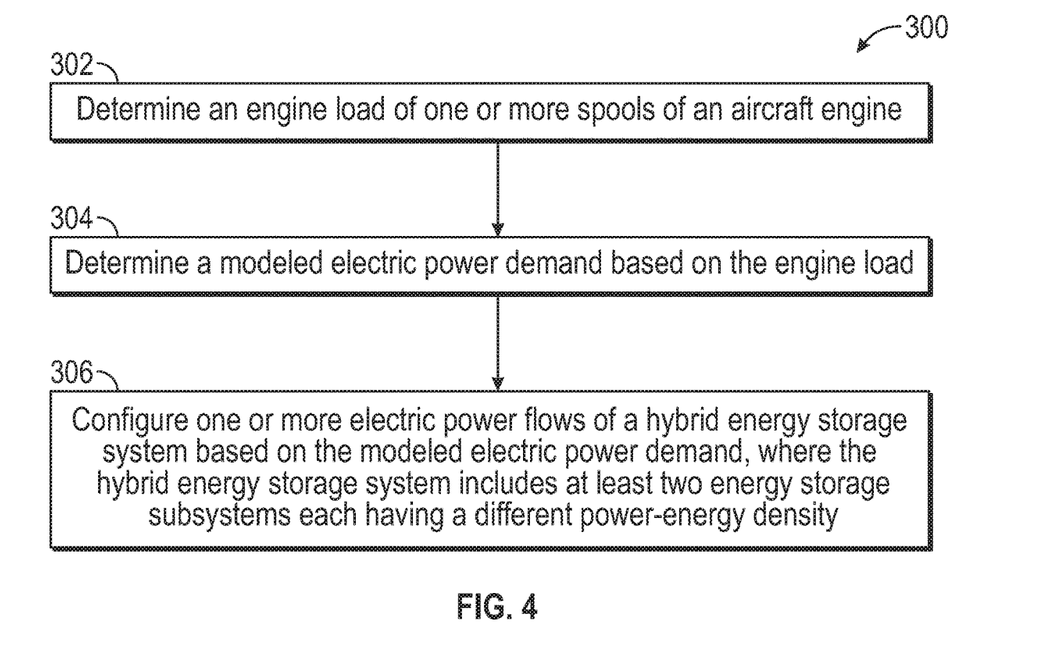
FIG. 4 is a flow chart illustrating a method in accordance with an embodiment of the disclosure.

FIG. 4 is a flow chart illustrating a method 300 of controlling a hybrid energy storage system 102 of a gas turbine engine 20 in accordance with an embodiment. The method 300 of FIG. 4 is described in reference to FIGS. 1-4 and may be performed with an alternate order and include additional steps. The method 300 can be performed, for example, by the power system 100 of FIG. 2 or an alternate configuration.

At block 302, controller 190 can determine an engine load of one or more spools of an aircraft engine, such as loads on the engine shaft 112 operably coupled to the one or more electric motors 110. At block 304, controller 190 can determine a modeled electric power demand based on the engine load. Modeled values can be determined using the model-based control 202 of FIG. 3. At block 306, the controller 190 can configure one or more electric power flows 120-124 of the hybrid energy storage system 102 based on the modeled electric power demand.

In embodiments, the controller 190 can detect one or more conditions of the at least two energy storage subsystems 103, such as the super/ultra-capacitor 104 and the battery system 106 and configure the one or more electric power flows 120-124 between the hybrid energy storage system 102 and the one or more electric motors 110 based on the one or more conditions of the super/ultra-capacitor 104 and the battery system 106. For example, the controller 190 can configure at least one of the one or more electric power flows 120-124 from a first energy storage subsystem of the at least two energy storage subsystems 103 to charge a second energy storage subsystem of the at least two energy storage subsystem 103, such as from the battery system 106 through a DC-to-DC converter 108 to charge the super/ultra-capacitor 104. The controller 190 can configure at least one of the one or more electric power flows 120-124 from the super/ultra-capacitor 104 through a bidirectional DC-to-DC converter 114 and power conditioning electronics 116 to power the one or more electric motors 110. Alternatively, the controller 190 can configure at least one of the one or more electric power flows 120-124 from the battery system 106 through the bidirectional DC-to-DC converter 114 and the power conditioning electronics 116 to power the one or more electric motors 110 and/or engine subsystem loads. The controller 190 may select between powering the one or more electric motors 110 by the super/ultra-capacitor 104 and/or the battery system 106 based on a power level of the modeled electric power demand and the one or more conditions of the super/ultra-capacitor 104 and the battery system 106. Further, the controller 190 may select between powering the one or more electric motors 110 by the super/ultra-capacitor 104 and/or the battery system 106 based on an expected duration of the modeled electric power demand and the one or more conditions of the super/ultra-capacitor 104 and the battery system 106. Further, the controller 190 can control the one or more electric motors 110 in a generator mode to charge the super/ultra-capacitor 104.

In some embodiments, the power management controller 190 is operable to predictively switch horsepower extractions from the gas turbine engine 20 to source power from the hybrid energy storage system 102 instead of the gas turbine engine 20 when the one or more electric motors 110 are being operated. Power transfers may be achieved by one or more automatic bus transfers (ABT). Further, if additional bus power is needed, an uninterruptable power supply (UPS) may be used to enhance electric bus stiffness.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A power system of an aircraft, the power system comprising:
   a hybrid energy storage system comprising at least two energy storage subsystems each having a different power-energy density;
   one or more electric motors operably coupled to the hybrid energy storage system and to an aircraft engine; and
   a means for controlling one or more electric power flows of the hybrid energy storage system to/from the one or more electric motors based on a modeled electric power demand associated with an engine load of one or more spools of the aircraft engine, wherein the modeled electric power demand is determined by a model-based control based on current engine load data and a projected engine load over one or more future time steps, the projected engine load being determined by an engine system model.

2. The power system of claim 1, wherein the means for controlling the one or more electric power flows of the hybrid energy storage system comprises a power management controller operable to detect one or more conditions of the at least two energy storage subsystems and configure the one or more electric power flows between the hybrid energy storage system and the one or more electric motors.

3. The power system of claim 2, wherein the power management controller is operable to configure at least one of the one or more electric power flows from a first energy storage subsystem of the at least two energy storage subsystems to charge a second energy storage subsystem of the at least two energy storage subsystems.

4. The power system of claim 3, wherein the first energy storage subsystem comprises a battery system and the second energy storage subsystem comprises a super/ultra-capacitor, and further comprising a bidirectional converter operably coupled to the super/ultra-capacitor and power conditioning electronics operably coupled to the one or more electric motors.

5. The power system of claim 4, wherein the power management controller is operable to configure at least one of the one or more electric power flows from the super/ultra-capacitor through the bidirectional converter and the power conditioning electronics to power the one or more electric motors.

6. The power system of claim 5, wherein the bidirectional converter is operably coupled to the battery system, and the power management controller is operable to configure at least one of the one or more electric power flows from the battery system through the bidirectional converter and the power conditioning electronics to power the one or more electric motors and/or engine subsystem loads.

7. The power system of claim 6, wherein the power management controller is operable to select between powering the one or more electric motors by the super/ultra-capacitor and/or the battery system based on a power level of the modeled electric power demand and the one or more conditions of the super/ultra-capacitor and the battery system, and further wherein the power management controller is operable to control the one or more electric motors in a generator mode and charge the super/ultra-capacitor.

8. The power system of claim 6, wherein the power management controller is operable to select between powering the one or more electric motors by the super/ultra-capacitor and/or the battery system based on an expected duration of the modeled electric power demand and the one or more conditions of the super/ultra-capacitor and the battery system.

9. The power system of claim 1, wherein the power management controller is operable to predictively switch to source power from the hybrid energy storage system instead of the aircraft engine when the one or more electric motors are being operated.

10. A method comprising:
determining, by a controller, an engine load of one or more spools of an aircraft engine;
determining, by the controller, a modeled electric power demand based on the engine load, wherein the modeled electric power demand is determined by a model-based control based on current engine load data and a projected engine load over one or more future time steps, the projected engine load being determined by an engine system model; and
configuring one or more electric power flows of a hybrid energy storage system based on the modeled electric power demand, wherein the hybrid energy storage system comprises at least two energy storage subsystems each having a different power-energy density.

11. The method of claim 10, further comprising:
detecting one or more conditions of the at least two energy storage subsystems; and
configuring the one or more electric power flows between the hybrid energy storage system and one or more electric motors based on the one or more conditions of the at least two energy storage subsystems.

12. The method of claim 11, further comprising:
configuring at least one of the one or more electric power flows from a first energy storage subsystem of the at least two energy storage subsystems to charge a second energy storage subsystem of the at least two energy storage subsystems.

13. The method of claim 12, wherein the first energy storage subsystem comprises a battery system and the second energy storage subsystem comprises a super/ultra-capacitor, and further comprising:
configuring at least one of the one or more electric power flows from the super/ultra-capacitor through a bidirectional converter and power conditioning electronics to power the one or more electric motors.

14. The method of claim 13, further comprising:
configuring at least one of the one or more electric power flows from the battery system through the bidirectional converter and the power conditioning electronics to power the one or more electric motors and/or engine subsystem loads.

15. The method of claim 14, further comprising:
selecting between powering the one or more electric motors by the super/ultra-capacitor and/or the battery system based on a power level of the modeled electric power demand and the one or more conditions of the super/ultra-capacitor and the battery system; and
controlling the one or more electric motors in a generator mode to charge the super/ultra-capacitor.

16. The method of claim 14, further comprising:
selecting between powering the one or more electric motors by the super/ultra-capacitor and/or the battery system based on an expected duration of the modeled electric power demand and the one or more conditions of the super/ultra-capacitor and the battery system.

17. The method of claim 10, further comprising:
predictively switching to source power from the hybrid energy storage system instead of the aircraft engine when the one or more electric motors are being operated.

18. A system for an aircraft, the system comprising:
a gas turbine engine comprising at least one shaft;
a hybrid energy storage system comprising a super/ultra-capacitor and a battery system;
one or more electric motors operably coupled to the hybrid energy storage system and to the at least one shaft; and
a means for controlling one or more electric power flows of the hybrid energy storage system to/from the one or more electric motors based on a modeled electric power demand associated with an engine load of the gas turbine engine, wherein the modeled electric power demand is determined by a model-based control based on current engine load data and a projected engine load over one or more future time steps, the projected engine load being determined by an engine system model.

19. The system of claim 18, wherein the means for controlling the one or more electric power flows of the hybrid energy storage system comprises a power management controller operable to detect one or more conditions of the super/ultra-capacitor and the battery system and configure the one or more electric power flows from the hybrid energy storage system to the one or more electric motors based on the one or more conditions and the engine load of the at least one shaft.

20. The system of claim 19, wherein the power management controller is operable to predictively switch to source power from the hybrid energy storage system instead of the gas turbine engine when the one or more electric motors are being operated.

* * * * *